United States Patent

Petruchik et al.

[11] Patent Number: 5,890,022
[45] Date of Patent: Mar. 30, 1999

[54] CAMERA WITH FLASH ILLUMINATION LIGHT SOURCE FOR PHOSPHORESCENT EXPOSURE COUNTER

[75] Inventors: Dwight J. Petruchik, Honeoye Falls; Donald P. McGinn, Palmyra, both of N.Y.

[73] Assignee: Eastman Kodak Company, Rochester, N.Y.

[21] Appl. No.: 6,879

[22] Filed: Jan. 14, 1998

[51] Int. Cl.⁶ .............................. G03B 1/66; G03B 15/03
[52] U.S. Cl. ..................... 396/176; 396/201; 396/267; 396/282; 396/284
[58] Field of Search ................................... 396/267, 176, 396/284, 282, 201

[56] References Cited

U.S. PATENT DOCUMENTS

| | | | |
|---|---|---|---|
| 2,298,403 | 3/1942 | Mihalyi | 396/135 |
| 3,729,626 | 4/1973 | Thurlow et al. | 362/31 |
| 4,758,716 | 7/1988 | Mayer et al. | 235/470 |
| 4,829,164 | 5/1989 | Rudolph et al. | 235/139 R |
| 4,914,278 | 4/1990 | Rudolph et al. | 235/10 |
| 5,339,125 | 8/1994 | Fridman et al. | 396/317 |
| 5,432,578 | 7/1995 | Suzuki | 396/281 |
| 5,486,885 | 1/1996 | Matsumoto | 396/267 |
| 5,572,283 | 11/1996 | Wakabayashi et al. | 396/279 |
| 5,784,658 | 7/1998 | Hata et al. | 396/267 X |

FOREIGN PATENT DOCUMENTS

| | | |
|---|---|---|
| 3-47532 | 5/1991 | Japan . |
| 7-104435 | 4/1995 | Japan . |

Primary Examiner—W. B. Perkey
Attorney, Agent, or Firm—Roger A. Fields

[57] ABSTRACT

A camera comprises an exposure counter for indicating the number of frames of a film load that have been exposed or remain to be exposed, and a flash illumination light source for illuminating a subject being photographed. The exposure counter has a phosphorescent substance that becomes luminescent due to the absorption of radiation and continues with an afterglow some time after the radiation has stopped, to permit one to read the exposure counter in dimly lit or dark ambience. A light pipe directs illumination from the light source to the phosphorescent substance. Thus, the exposure counter can be read in dimly lit or dark ambience after the light source has been used.

5 Claims, 2 Drawing Sheets

CAMERA WITH FLASH ILLUMINATION LIGHT SOURCE FOR PHOSPHORESCENT EXPOSURE COUNTER

FIELD OF THE INVENTION

The invention relates generally to the field of photography, and in particular to cameras. More specifically, the invention relates to a camera with a phosphorescent exposure counter and a light source, for example an electronic flash, for making the phosphorescent exposure counter luminescent.

BACKGROUND OF THE INVENTION

Practically every camera that is available today comes equipped with an exposure counter for indicating the number of frames of a film load that have been exposed or remain to be exposed.

When taking pictures in dimly lit or dark ambience, it is difficult and at times impossible to read the exposure counter. Thus, cameras have been provided with a light source for illuminating the exposure counter.

SUMMARY OF THE INVENTION

A camera comprising an exposure counter for indicating the number of frames of a film load that have been exposed or remain to be exposed, and a flash illumination light source for illuminating a subject being photographed, is characterized in that:

the exposure counter has a phosphorescent substance that becomes luminescent due to the absorption of radiation and continues with an afterglow some time after the radiation has stopped, to permit one to read the exposure counter in dimly lit or dark ambience; and a light pipe directs illumination from the light source to the phosphorescent substance, whereby the exposure counter can be read in dimly lit or dark ambience after the light source has been used.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
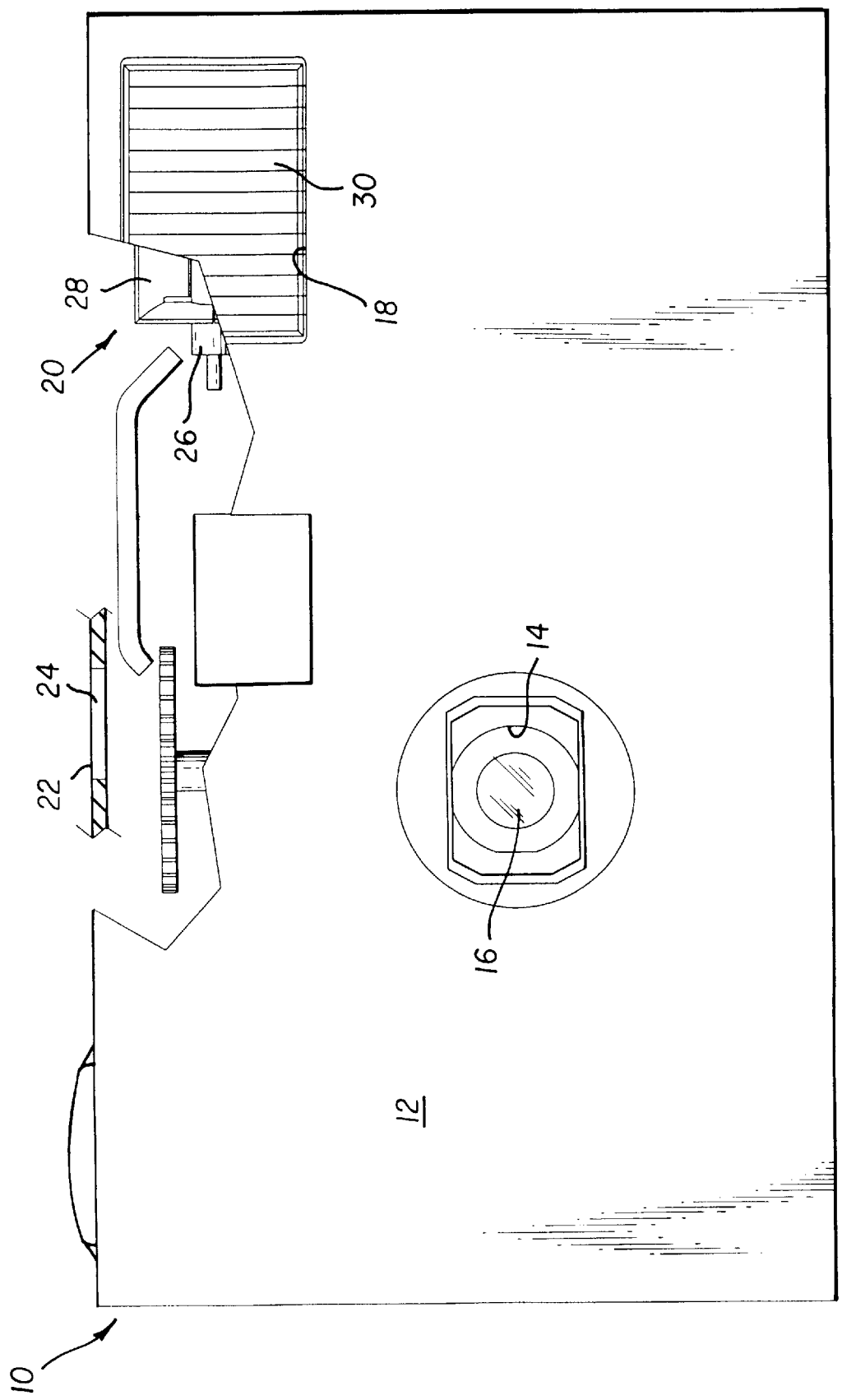
FIG. 1 is a front elevation view of a camera with a flash illumination light source for a phosphorescent exposure counter, according to a preferred embodiment of the invention.
Figure 2:
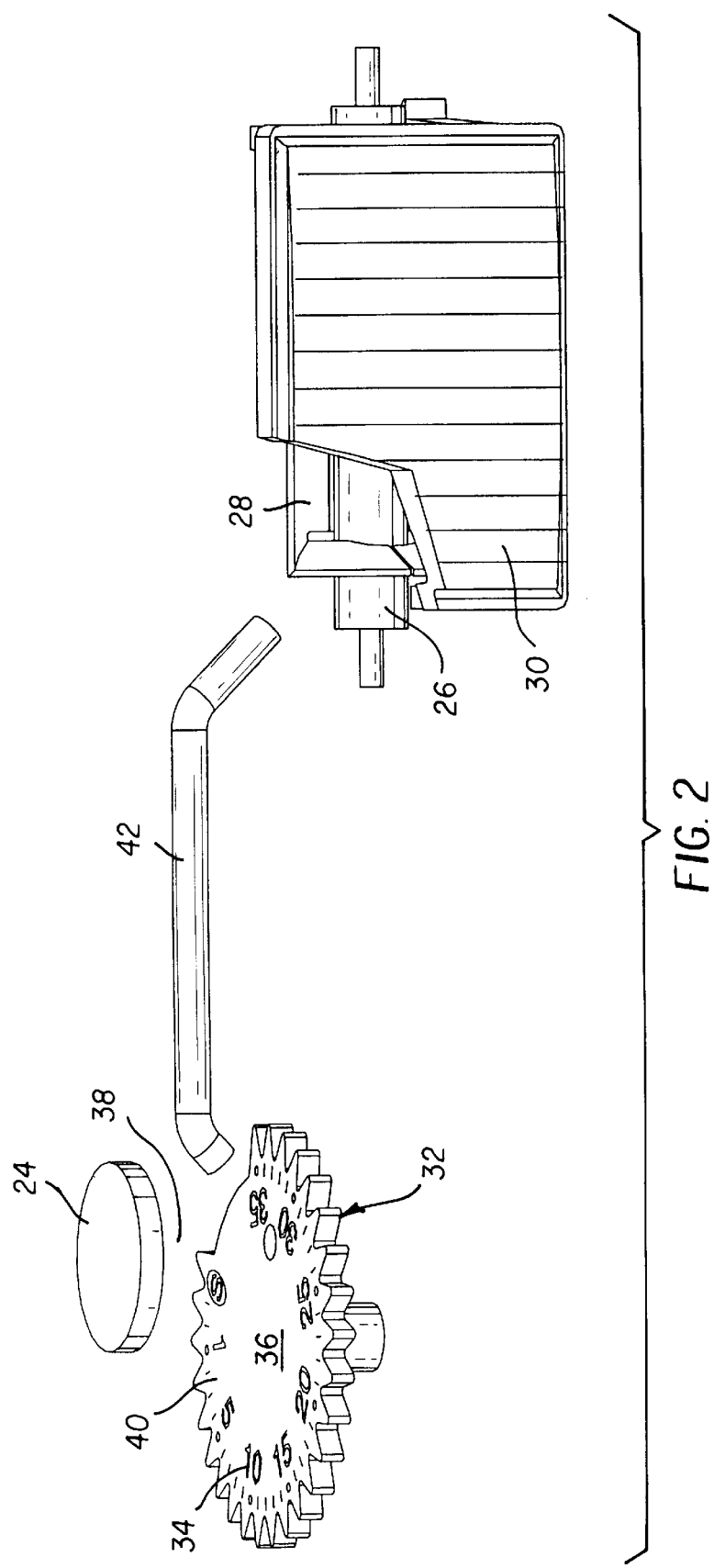
FIG. 2 is a perspective drawing of the flash illumination light source and the phosphorescent exposure counter.

Referring now to the drawings, FIGS. 1 and 2 show a camera 10 comprising a housing 12 having a front opening 14 for a taking lens 16, a front opening 18 for a built-in electronic flash unit 20, and a top opening 22 for a window in the form of a magnifying lens 24.

The electronic flash unit 20 operates as a flash illumination light source for illuminating a subject being photographed and is a known type including a flash tube 26, a flash reflector 28 and a flash cover lens 30.

An exposure counter wheel 32 is rotatably supported inside the housing 12 and has successive indicia 34, including the numbers "1", "5", "10", "15", "20", "25", "30" and "35", printed in blackon a top face 36 of the counter wheel. The counter wheel 32 is rotatable to move the indicia 34 one after another to a viewing site 38 beneath the magnifying lens 24. In FIG. 2 the counter wheel 32 is rotated counter-clockwise and the indicia 34 serve to identify the number of frames of a film load (not shown) in the housing 12 that remain to be exposed. However, the indicia 34 can serve to identify the number of frames of the film load in the housing 12 that have been exposed simply by reversing the order of the indicia or by rotating the counter wheel 32 clockwise in FIG. 2.

The top face 36 of the counter wheel 32, not including the indicia 34, has a known type phosphorescent substance 40 that becomes luminescent due to the absorption of radiation and continues with an afterglow some time after the radiation has stopped, to permit one to read the each one of the indicia at the viewing site 38 in dimly lit or dark ambience. To make the phosphorescent substance 40 luminescent in the vicinity of the viewing site 38, a light pipe 42 directs illumination from the flash tube 26 to adjacent the viewing site each time the flash unit 20 is used, as shown in FIG. 2. The flash unit 20 may be a flash-every-exposure type.

The invention has been described with reference to a preferred embodiment. However, it will be appreciated that variations and modifications can be effected by a person of ordinary skill in the art without departing from the scope of the invention. For example, the indicia 34 rather than the top face 36 of the counter wheel 32 may have the phosphorescent substance 40.

PARTS LIST 10. camera
12. housing
14. front opening
16. taking lens
18. front opening
20. electronic flash unit
22. top opening
24. magnifying lens
26. flash tube
28. flash reflector
30. flash cover lens
32. exposure counter wheel
34. indicia
36. top face
38. viewing site
40. phosphorescent substance
42. light pipe

What is claimed is:

1. A camera comprising an exposure counter for indicating the number of frames of a film load that have been exposed or remain to be exposed, and a flash illumination light source for illuminating a subject being photographed, is characterized in that:

said exposure counter has a phosphorescent substance that becomes luminescent due to the absorption of radiation and continues with an afterglow some time after the radiation has stopped, to permit one to read the exposure counter in dimly lit or dark ambience; and a light pipe directs illumination from said light source to said phosphorescent substance, whereby said exposure counter can be read in dimly lit or dark ambience after said light source has been used.

2. A camera as recited in claim 1, wherein said exposure counter has successive indicia for identifying the number of frames of a film load that have been exposed or remain to be exposed and is rotatable to move said indicia one after another to a viewing site to permit them to be seen, and said light pipe directs illumination from said light source to adjacent said viewing site.

3. A camera as recited in claim 2, wherein each of said indicia has said phosphorescent substance.

4. A camera as recited in claim 2, wherein respective areas surrounding each of said indicia have said phosphorescent substance and the indicia does not have the phosphorescent substance.

5. A camera as recited in claim 2, wherein a magnifying lens covers said viewing site to which said indicia are moved one after another.

* * * * *